US011644389B2

(12) United States Patent
Hasler et al.

(10) Patent No.: US 11,644,389 B2
(45) Date of Patent: May 9, 2023

(54) FUEL CAP TESTING APPARATUS

(71) Applicant: Kohler Co., Kohler, WI (US)

(72) Inventors: David Hasler, Kohler, WI (US); Christopher Wolf, Kohler, WI (US)

(73) Assignee: KOHLER CO.

(*) Notice: Subject to any disclaimer, the term of this patent is extended or adjusted under 35 U.S.C. 154(b) by 305 days.

(21) Appl. No.: 17/063,776

(22) Filed: Oct. 6, 2020

(65) Prior Publication Data
US 2021/0108990 A1 Apr. 15, 2021

Related U.S. Application Data

(60) Provisional application No. 62/914,043, filed on Oct. 11, 2019.

(51) Int. Cl.
| | |
|---|---|
| *G01M 99/00* | (2011.01) |
| *G01G 9/00* | (2006.01) |
| *B60K 15/04* | (2006.01) |
| *G05D 7/06* | (2006.01) |
| *B60K 15/03* | (2006.01) |

(52) U.S. Cl.
CPC ......... *G01M 99/00* (2013.01); *B60K 15/0406* (2013.01); *G01G 9/00* (2013.01); *G05D 7/0652* (2013.01); *B60K 2015/03236* (2013.01); *B60K 2015/03256* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,807,219 | A | * | 4/1974 | Wallskog | G01M 3/26 73/40 |
| 5,323,640 | A | * | 6/1994 | Porcaro | G01M 3/3236 73/40 |
| 5,756,882 | A | * | 5/1998 | Cranfill | G01M 3/2869 141/96 |
| 5,952,559 | A | * | 9/1999 | Harris | G01M 3/3209 73/114.38 |

(Continued)

OTHER PUBLICATIONS

"Small Off-Road Engine Evaporative Emissions Test Procedure; TP902, Test Procedure for Determining Diurnal Emissions from Small Off-Road Engines." California Environmental Protection Agency Air Resources Board. Adopted: Jul. 26, 2004. Amended: Sep. 18, 2017. (26 pages).

(Continued)

*Primary Examiner* — Natalie Huls
(74) *Attorney, Agent, or Firm* — The Belles Group, P.C.

(57) ABSTRACT

An apparatus for testing a fuel cap includes a gas manifold, a fuel cap connector, a base, and a removable cover. The gas manifold is configured to provide a bidirectional flow path through the fuel cap. The fuel cap connector is integrated with or coupled to the gas manifold, and the fuel cap connector is configured to connect the fuel cap to the gas manifold. The base is configured to support the gas manifold and provide at least a first gas input to the gas manifold and through the fuel cap via the bidirectional flow path. The removable cover is configured to be removably connected to the gas manifold and provide at least a second gas input to the gas manifold and through the fuel cap via the bidirectional flow path.

8 Claims, 8 Drawing Sheets

(56) References Cited

U.S. PATENT DOCUMENTS

| | | | | |
|---|---|---|---|---|
| 5,996,402 A | * | 12/1999 | Harris | G01M 3/26 |
| | | | | 73/40 |
| 6,230,549 B1 | * | 5/2001 | Harris | G01M 3/2869 |
| | | | | 73/40 |
| 6,298,712 B1 | * | 10/2001 | Docy | G01M 3/3236 |
| | | | | 73/40 |

OTHER PUBLICATIONS

Model 110 Canister Conditioning Bench Brochure, Webber EMInc. 2017. (3 pages).

* cited by examiner

FUEL CAP TESTING APPARATUS

This application claims priority benefit of Provisional Application No. 62/914,043 filed Oct. 11, 2019, which is hereby incorporated by reference in its entirety.

FIELD

This disclosure relates in general to a fuel cap for an internal combustion engine, and more specifically, to apparatus and techniques for testing the evaporative emissions of the fuel cap.

BACKGROUND

A fuel tank for an internal combustion engine encloses and stores combustible fuel. The fuel may include hydrocarbons. The fuel naturally evaporates into the atmosphere. When hydrocarbons evaporate and escape to the atmosphere, the hydrocarbons may become pollutants. Evaporation rates may be increased by heat from warm weather. Evaporation levels may accumulate over time for engines that often spend long periods of time between starts and/or spend long periods in non-climate controlled environments such as garages. Evaporation is also caused from heat from the operation of the engine.

A fuel cap may vent pressurized fuel vapor out of the fuel tank into one or more filters for removing hydrocarbons. High pressure in the fuel tank may affect the venting of the pressurized vapor. Challenges remain in venting of evaporative fuel vapors from the fuel tank.

BRIEF DESCRIPTION OF THE DRAWINGS

Exemplary embodiments are described herein with reference to the following drawings.

DETAILED DESCRIPTION

The following embodiments describe a test container for testing a fuel cap. The test container provides an additional, unique capability to capture the effects of gas leaks around the rubber seal of the gasoline cap where it is attached to the tank fitting. If the rubber seal is leaking, the test container will still capture the escaping flow of the gases in the separate carbon capture vessel thereby registering a weight gain which will be assumed to be by-pass gas as if it had flowed through the cap and its carbon bed and not been adsorbed.

The test apparatus (including the test container) can control the measured flow (via mass flow meters and controllers) and the subsequent mixing of the butane ($C_4H_{10}$) gas and nitrogen ($N_2$) gas to meet the regulations required composition of 50% by volume $C_4H_{10}$ and 50% by volume $N_2$ for the adsorption/saturation cycle. The test apparatus also allows the control and measured flow of the $N_2$ or air to conduct the regeneration/purging cycle.

The test apparatus is designed to conduct the purging cycle with either $N_2$ as a positive pressure (above atmospheric process) or with air under vacuum (below atmospheric process) thereby meeting formal testing requirements.

The test apparatus provides the ability to regenerate/flush a gasoline cap in a manner which represents the physical process that occurs in its intended application. The fuel cap is regenerated or flushed to remove the material previously adsorbed by the filter. In either configuration, the $N_2$ or air can be controlled and metered to meet the required flow rate to adhere to the regulations. It also provides the ability to flush the cap to remove any residual butane gas before removing the cap and thereby reducing the possibility of a hazard.

The test apparatus (container, valves, flow meters, scales and data acquisition and control system) can be operated in an automated or manual configuration. The control algorithm can be written to ensure stabilization is achieved with measured flow rates and mass weights and adjusting flow controllers with one or more proportional-integral-derivative controllers (PID controllers).

The test apparatus simulates or replication the natural flow of gases that would be experienced by a fuel cap when mounted on a fuel tank on an engine. In other words, the mixing of the butane ($C_4H_{10}$) gas and nitrogen ($N_2$) gas simulates the vapor that would evaporate or otherwise be expelled from the fuel tank. Thus, the test apparatus can measure the ability of the fuel cap to adsorb fuel vapors as would be present when used with an engine and fuel tank.

Figure 1:
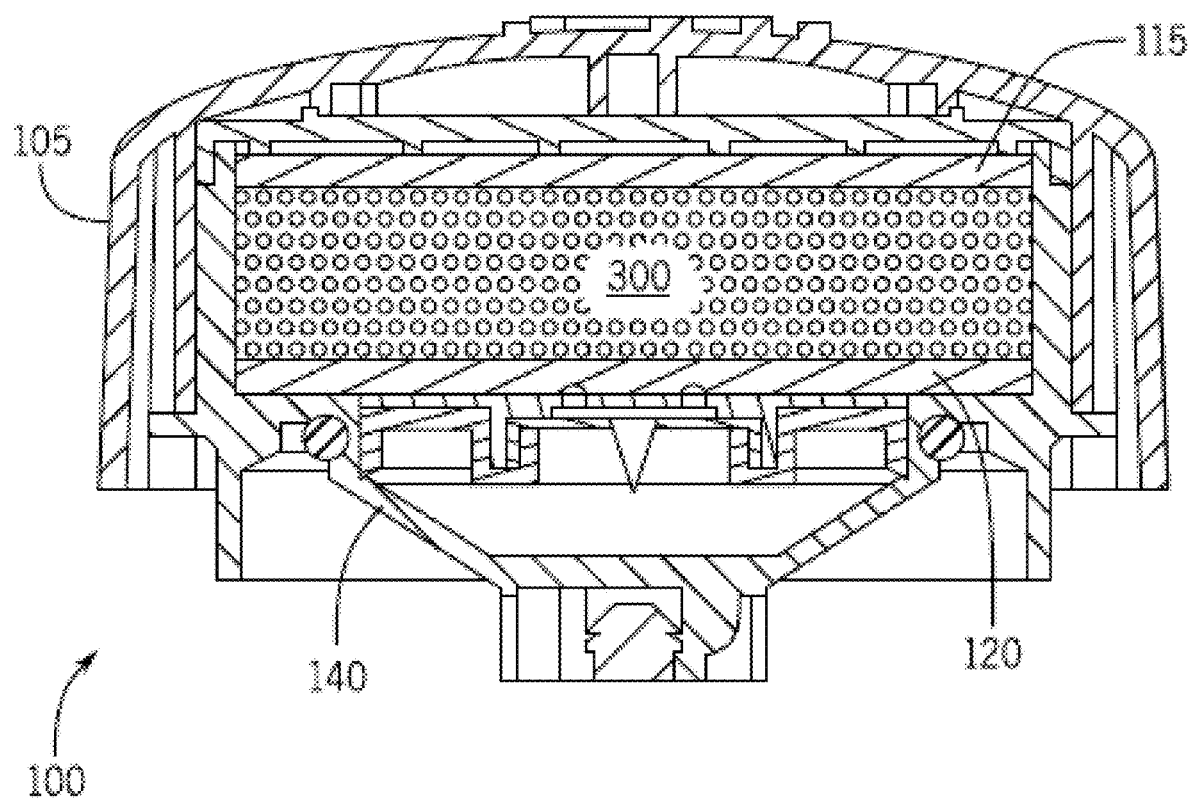
FIG. 1 illustrates a fuel cap.

FIG. 1 illustrates a fuel cap 100, which may include at least an outer shell or cover 105, and an internal sleeve 140. The internal sleeve 140 may couple internal components of the fuel cap 100 together. The internal sleeve 140 may include a threading or another coupling mechanism to secure the fuel cap 100 to a fuel port of an engine. It is desirable to reduce or minimize the amount of hydrocarbon evaporative emissions from these types of devices. The fuel cap 100 includes an evaporative emission reduction device for reducing the leakage or escape of emissions from the fuel tank of the engine. For example, a hydrocarbon filter 300 (e.g., activated carbon) that removes hydrocarbon material from the vapor released from the fuel tank. The fuel cap 100 includes a first path for air flow through the fuel cap 100 in a first direction and a second path for air flow through the fuel cap 100 in a second direction. For example, when mounted on a fuel tank, the first path may allow pressure to vent from inside the tank to the ambient environment through the filter 300, and the second path may allow pressure to vent into the tank and a partial vacuum is created inside the tank as fuel is drained from the tank to the engine.

The hydrocarbon filter may adsorb hydrocarbons from the vapor. The hydrocarbon filter 300 may include adsorption capsules. Vapor entering the hydrocarbon filter may be hydrocarbon evaporative emission and the flow leaving the hydrocarbon filter may be considered scrubbed vapor or air. The scrubbed air may be safe for release into the atmosphere according to one or more guidelines or regulations. Adjacent to the hydrocarbon filter 300 may be an upper filter 115, a lower filter 120, or both, which may be formed from a felt or another type of fabric. Example types of fabric include a compounding non-spinning fabric. The combination of the upper filter 115 the lower filter 120 may be referred to as a bilayer compounding non-spinning fabric. In one example, three layers (e.g., upper filter 115a, middle filter, and lower filter 120a) form a trilayer fabric. The fuel cap 100 may include one or more cap vents (e.g., opening) at the top of the fuel cap 100 to release the scrubbed air to the atmosphere.

The engine may be a small internal combustion engine applicable to chainsaws, lawn mowers, wood chippers, stump grinders, concrete trowels, mini excavators, concrete saws, portable saw mills, weed trimmers, all-terrain vehicles, wood splitters, pressure washers, garden tillers, tractors, plows, snow blowers, welding equipment, generators, and other devices. Often such small engine containing devices are used in close proximity to a user (e.g., a human). It is desirable to reduce or minimize the amount of hydrocarbon evaporative emissions from these types of devices. The fuel cap 100 includes an evaporative emission reduction device for reducing the leakage or escape of emissions from the fuel tank of the engine. In order to test the whether the fuel cap 100 adequately filters hydrocarbons, the fuel cap 100 may be tested by measuring the scrubbed air to minimize evaporation of emissions from small off-road engines.

The fuel may be gasoline or diesel. The fuel may be a gaseous fuel such as liquefied petroleum gas (LPG), hydrogen gas, natural gas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture.

The engine may be a multiple cylinder engine or a single cylinder engine. A carburetor or a fuel injection system may mix the fuel in the fuel tank with air to create a combustible mixture for the engine. The engine may be four-stroke cycle engines, meaning four piston strokes make up a cycle. A compression cycle of the engine includes an intake stroke, a compression stroke, a power stroke, and an exhaust stroke. During the intake stroke, the piston moves from the top of the cylinder to the bottom of the cylinder. A fuel and air mixture is forced by a pressure into the cylinder. Next, during the compression stroke, the piston moves back to the top of the cylinder, compression the fuel and air mixture into the cylinder head. The fuel is injected and/or atomized into the cylinder by a nozzle of the fuel injector. Next, during the power stroke, the compressed fuel and air mixture is ignited by a spark plug or heat source. The piston is pushed back down toward the bottom of the cylinder by the pressure. Finally, during the exhaust stroke, the piston returns to the top of the cylinder to expel the spent or combusted fuel and air mixture through an exhaust valve. In spark ignition engines, the air and fuel mixture is forced into the cylinder during intake and after the piston compresses the mixture, the spark ignites the mixture. The combustion from the spark causes gas to expand, which pushes the piston during the power stroke.

Other systems in the engine may include a fuel tank, a fuel line, a retractable starter, a starter handle, an air cleaning system, a muffler, a control portion, a governor system, a throttle system, and an engine control system.

Rather than alter the fuel cap 100 to conduct the testing procedure, the following embodiments include a sealable box or cylinder system configured to enclose the fuel cap 100 in a manner that allows the metering and capture of gases as the gases flow into and out of multiple ports on the fuel cap 100. This improves the technology of fuel cap testing because the process is improved in speed and efficiency. Further, fuel caps are not damaged for testing. Finally, the results of the tests are more reliable when the same testing system can be used for multiple test trials and multiple fuel caps.

Figure 2:
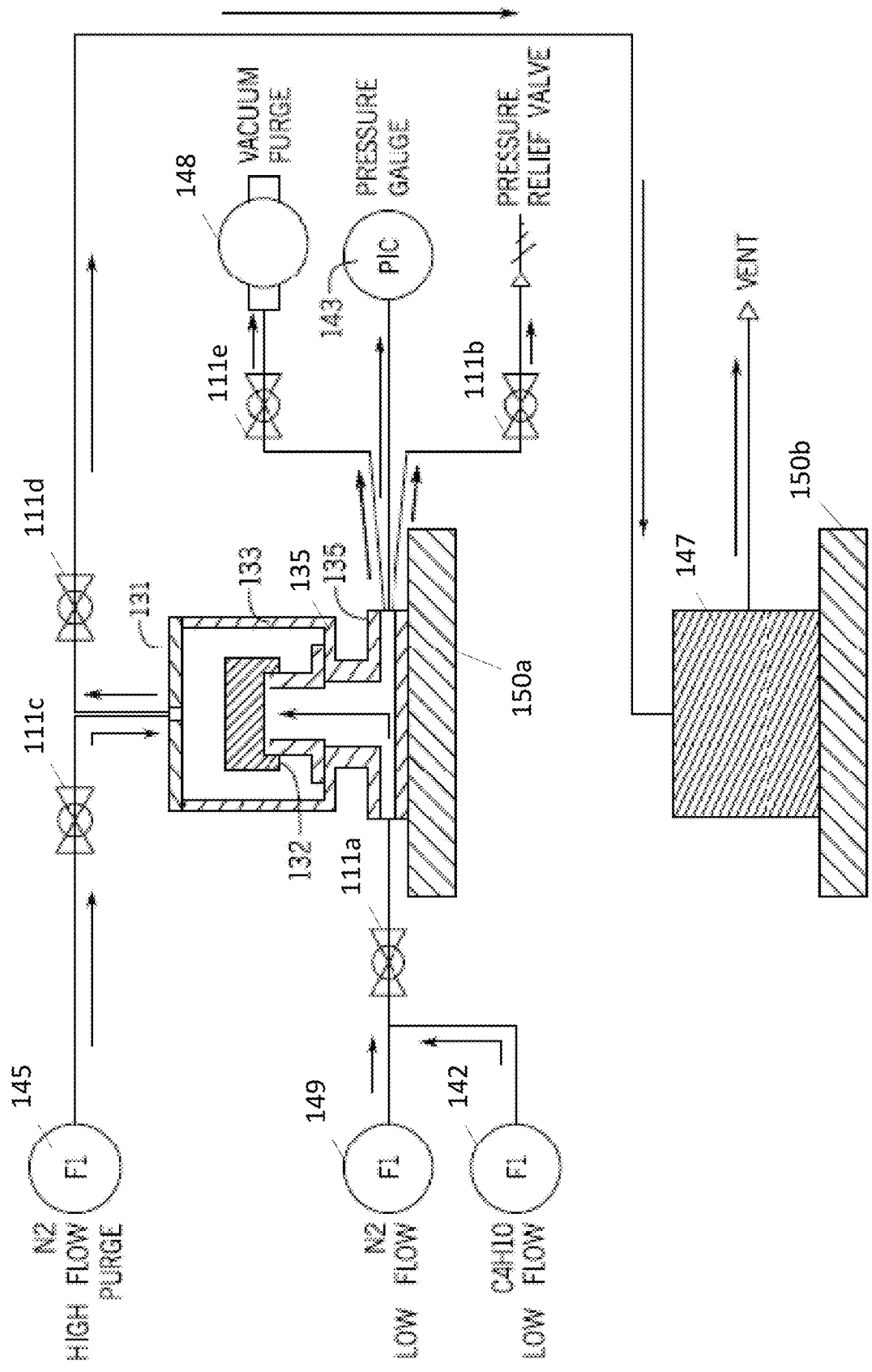
FIG. 2 illustrates an example testing apparatus for testing the evaporative emissions of the fuel cap.

FIG. 2 illustrates an example testing apparatus for testing the evaporative emissions of the fuel cap 100. A sealed test canister is formed from the combination of a removable cover 131 and a gas manifold 133. The sealed test canister is supported by, or includes, a base 135. A fuel cap connector 132 is integrated with or coupled to the gas manifold and the fuel cap connector 132 is configured to connect the fuel cap 100 to the gas manifold 133. The fuel cap connector 132 is similar in shape to the connector on the fuel port on an engine.

The test apparatus includes a bidirectional flow path through the fuel cap 100 for gas to flow in a first direction and a second direction, which may be in the direction of gravity and opposite the direction of gravity. The bidirectional flow path passes through the removable cover 131, the gas manifold 133, and the base 135, as illustrated in FIG. 2.

The bidirectional flow path in in communication with at least two gas inputs and at least two gas outputs. The base 135 provides at least a first gas input to the gas manifold 133 and through the fuel cap via the bidirectional flow path, and the removable cover 131 provides at least a first gas output out of the gas manifold 133. A first path leads from the base 135 to the removable cover 131 so that a gas may be pumped, or otherwise provided under pressure, along the first path.

The removable cover 131 is configured to be removably connected to the gas manifold 133 and provide at least a second gas input to the gas manifold and through the fuel cap 100 via the bidirectional flow path. The base 135 provides at least a second gas output out of the gas manifold 133. A second path leads from the removable cover 131 to the base 135 so that a gas may be pumped, or otherwise provided under pressure, along the second path.

The testing may include three main sequences. A first sequence may a saturation sequence. A second sequence may be a purge sequence. A third sequence may cycle between the first sequence and the second sequence while monitoring and analyzing results. A control circuit or other automated interface may supply valve setting signals to the valves and receive data from sensors in order to control the sequences. One or more filters in the first sequence includes a carbon filter internal to the fuel cap and one or more filters in the second testing sequence includes a carbon filter external to the fuel cap.

The first sequence may include one or more valve settings and measurements for the fuel cap 100. A first supply tank or line 149 may provide a first low flow source of gas (e.g., $N_2$) and a second supply tank or line 142 may provide a second low flow source of gas (e.g., $C_4H_{10}$). The first and second sources of gas may combine to form a saturation gas ($N_2/C_4H_{10}$). Flow of the saturation gas into the testing apparatus may be controlled by the valve 111a. The saturation gas may flow through the fuel cap 100 then out of the gas manifold 133. Flow of the filtered saturation gas out of the testing apparatus may be controlled by the valve 111d, which opens the flow to the bypass bed 147.

The second sequence may include one or more valve settings and measurements for the fuel cap 100 for purging vapors back to the fuel tank. A third supply tank or line 145 may provide a high flow source of gas (e.g., nitrogen $N_2$ or air including oxygen $O_2$). Flow of the purging gas into the testing apparatus may be controlled by the valve 111c. The purge has may flow through the fuel cap 100 to purge the vapors trapped (adsorbed) by the hydrocarbon filter 300 to simulate purging the vapors to the fuel tank of the engine. In addition or as an alternative to the high flow source of gas, a vacuum purge 148 may provide a vacuum or low pressure are on the purge path to draw gas through the testing apparatus. The vacuum purge 148 may be activated or deactivate using valve 111*e*. Any to all of the valves 111*a-e* may be controlled by a solenoid.

Figure 3:
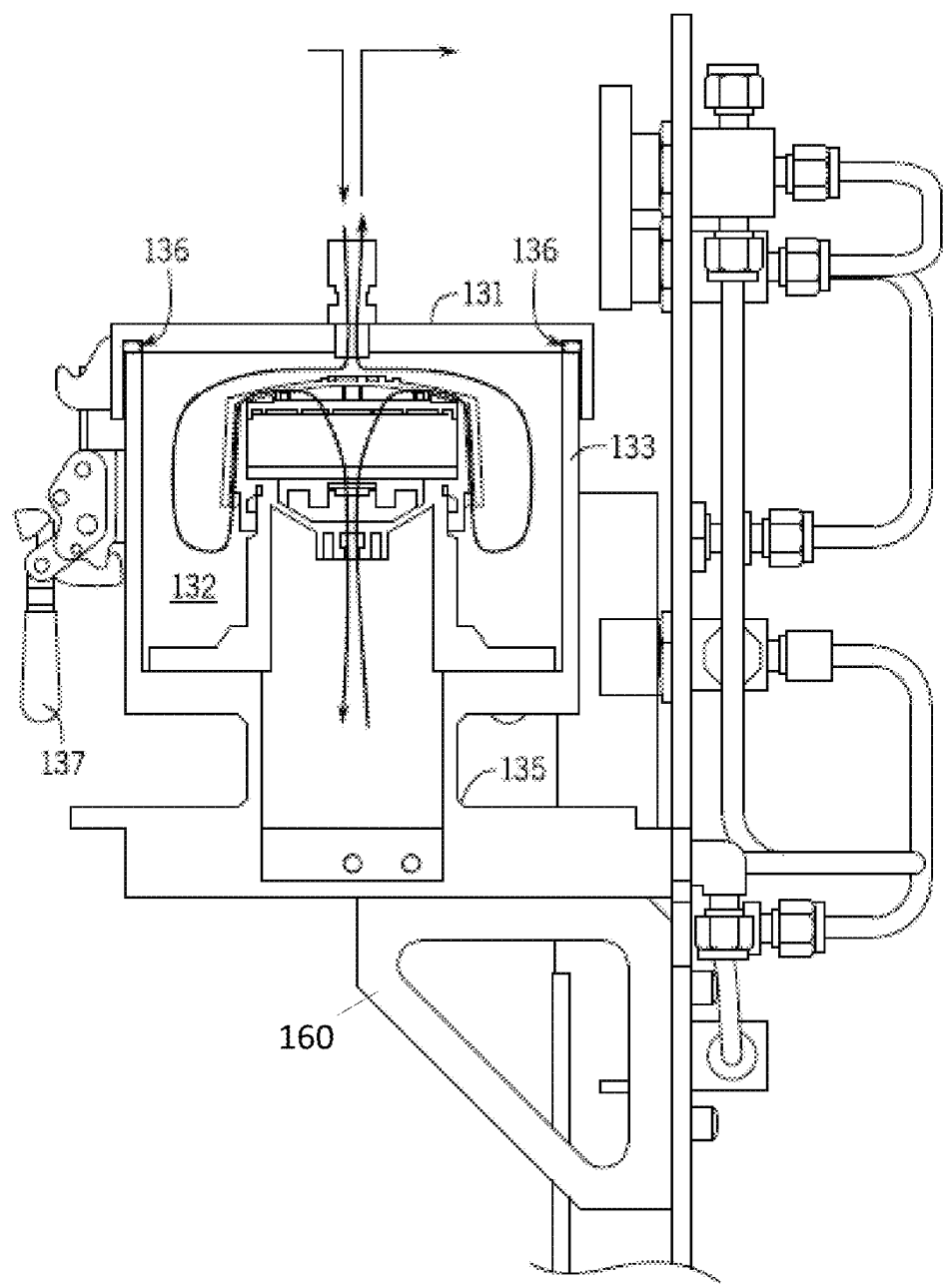
FIG. 3 illustrates an example testing apparatus installation.

As illustrated in FIG. 3, the removable cover 131 is sealed to the gas manifold 133 to form the sealed test container using at least one seal to prevent gases from leaking from the sealed test container. While the seal includes a large area over which the risk of a gas leak could become problematic during testing due to the repeated removal of the cover 131 to take measurements on the fuel cap 100, the seal prevents leaking.

The at least one seal may include an O-ring, for example at seals 136, or another gasket in the shape of a torus. One of the removable cover 131 or the gas manifold 133 may be coupled to the gasket (e.g., through an adhesive). The other of the removable cover 131 or the gas manifold 133 may include a groove to seat the gasket. Compression between the removable cover 131 and the gas manifold 133 creates a seal at the interface of the gasket and the groove. The compression may be provided by a variety of mechanisms including a latch clamp 137 having a handle that is moved from a first position (e.g., released position) into a second position (e.g., locked position) by actuating a clamping pull bar (e.g., hook) around an opposing latch and pressed down. In one example, the removable cover 131 includes the opposing latch and the gas manifold 133 includes the handle and clamping pull bar.

Figure 4:
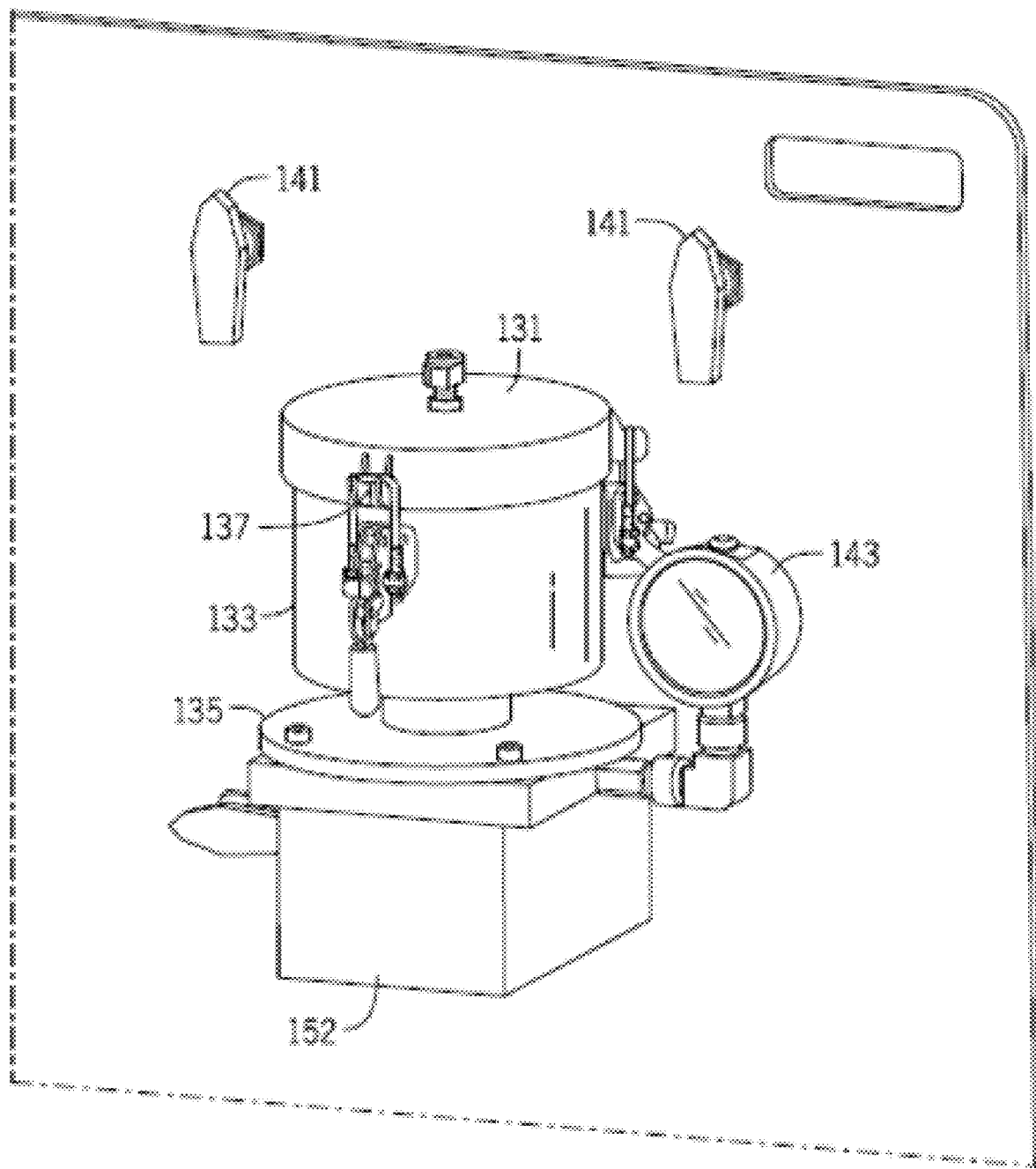
FIG. 4 illustrates an example testing apparatus with a removable cover sealed to the testing apparatus.
Figure 5:
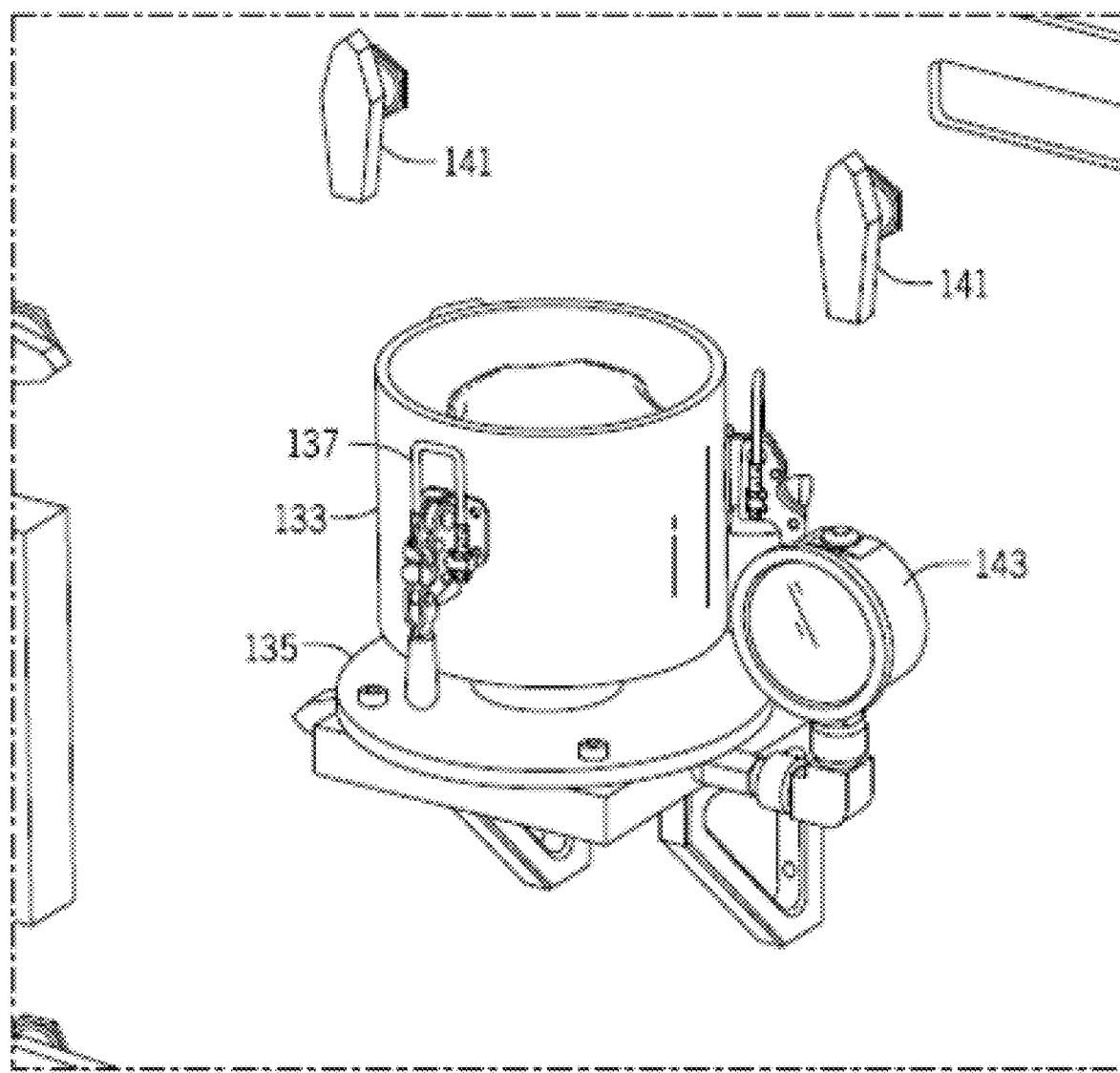
FIG. 5 illustrates an example testing apparatus with a removable cover removed from the testing apparatus.

FIG. 3 illustrates an example testing apparatus installation statically mounted to a wall or other structure with a mounting bracket 160 and one or more fastening devices (e.g., screws or bolts). FIG. 4 illustrates an example testing apparatus with a removable cover 131 sealed to the testing apparatus, which may be removably supported by a scale 152. FIG. 5 illustrates an example testing apparatus with a removable cover 131 removed from the testing apparatus and including a pressure gauge 143 with a display readout so that a user can monitor the operating state of the testing apparatus.

One or more valves 141 may allow the user to provide a flow of one or more gases (e.g., purge gas and cyclic gas) to the testing apparatus. A pressure gauge 143 allows the user to monitor the pressure in the sealed test container of the testing apparatus.

The pressure gauge 143 is used to verify the test is conducted at conditions representative of the component's (e.g., fuel cap 100) intended application and as a safety feature to identify overpressure conditions. Alternatively, a separate pressure transducer can be installed to digitally read and record the pressure during testing and use for an alarm system if an overpressure conditions occurs. The analog gauge provides a backup or safety check to the user to verify the actual operating condition of the testing apparatus in case there is a power or electronic system malfunction.

Figure 6:
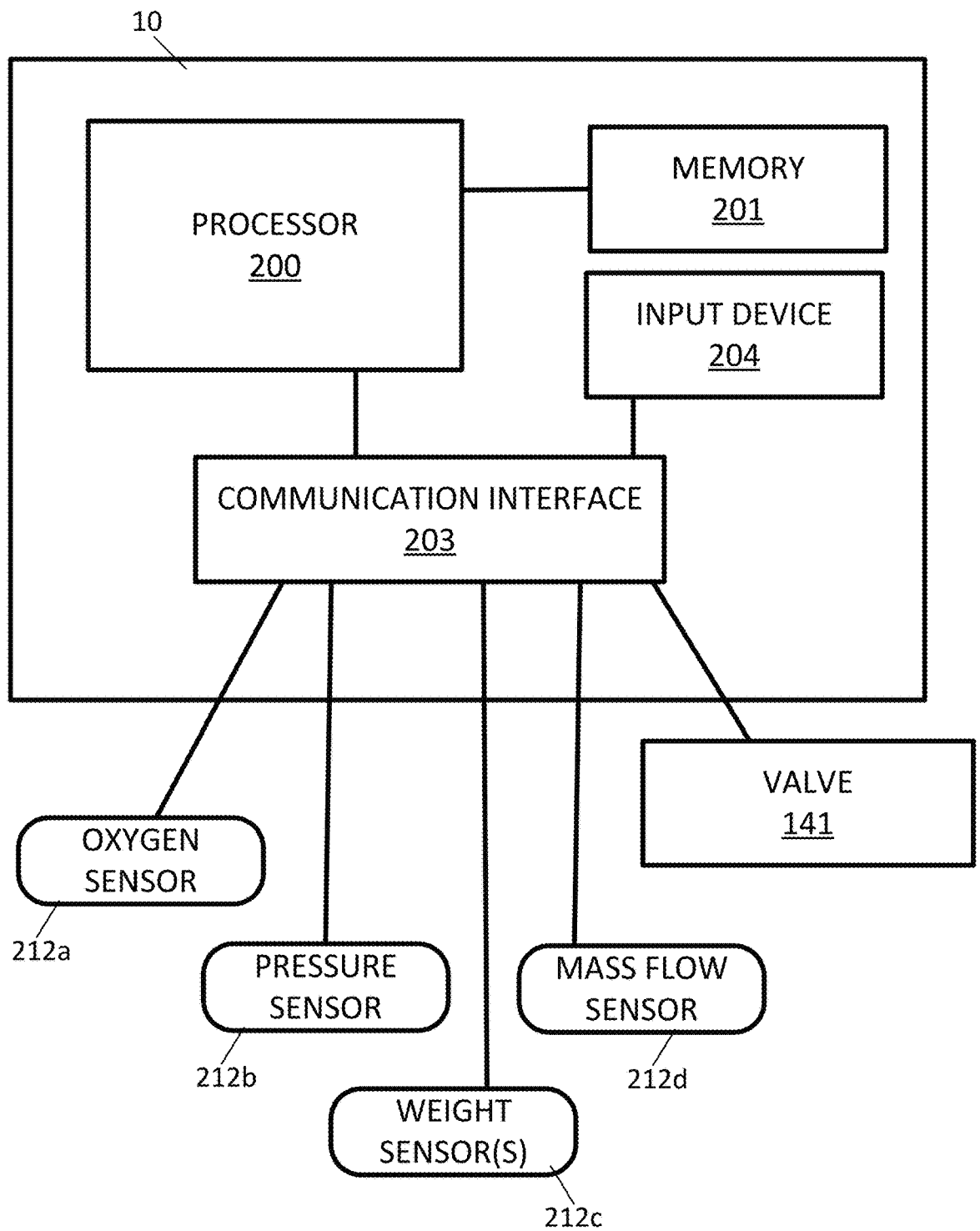
FIG. 6 illustrates a controller for operating the testing apparatus.

Alternatively, the valves 141 may be operated by a controller 10 and the pressure may be monitored by the controller 10. The controller 10 may generate command signals for solenoids associated with each of the valves 141 (e.g., valves 111*a-e*). A pressure relief valve may release pressure from the sealed test container if the pressure exceeds a configurable pressure level. An example controller 10 is illustrated in FIG. 6, including a processor 200, a memory 201, an input device 204, and a communication interface 203. The communication interface 203 may communicate with one or more sensors such as an oxygen sensor 212*a*, a pressure sensor 212*b*, one or more weight sensors (scales) 212*c*, and/or a mass flow sensor 212*d*. Additional, different, or fewer components may be included.

The one or more weight sensors (scales) 212*c* may measure the weight of the fuel cap and/or bypass filter. Using any of the examples described herein to monitor the flows of saturation gas and/or purge gas to the testing apparatus, the controller 10 may received sensor data from pressure sensor(s) 212*b* and mass flow sensor(s) 212*d*. The data from the pressure sensors 212*b*, which may be arranged in different flow paths in the testing apparatus, indicates the direction and/or volume of the flows of gas. Indirectly, the pressure sensor 212*b* may be placed before or after any of the valves to monitor that the valves are operation. Similarly, the mass flow sensors 212*d* may be arranged in different flow paths in the testing apparatus to indicate the direction and/or volume of the flows of gas, as well as the mass of the gas, which indicates the type of gas being detected.

In addition to the testing sequence and purging sequence described above, the controller 10 may implement one or more system integrity checks. One system integrity check is a flammability test. The oxygen sensor 212*a* may be placed in any of the gas lines to monitor the oxygen content of the gas. The controller 10 may compare the output of the oxygen sensor 212*a* to a predetermined level of oxygen. When the predetermined level of oxygen is exceeded, the controller 10 may generate a warning that is displayed on the testing apparatus or communicated to the user through a network. The flammability test may be performed as part of the purge sequence, for example, at the end of the purge sequence.

Another system integrity check is for leaks. The controller 10 may perform either conduct positive (above ambient pressure) pressure tests or negative/vacuum pressure tests. The integrity check for leaks pressurizes the cap containment system with $N_2$ or air, stops the flow of gas, then shut all containment valves shut. For example, the controller 10 may send valve commands to all of the valves (e.g., valves 111*a-e*). With the valves closed, the controller 10 monitors the pressure of the system over time using the pressure sensor(s) 212*b*.

If the pressure of the testing apparatus does not decrease by a predetermined amount, the controller 10 determines that there is no leak. If the pressure of the testing apparatus decreases by more than the predetermined amount, the controller 10 may report to the user via local display or a transmitted message that there may be a leak.

Figure 7:
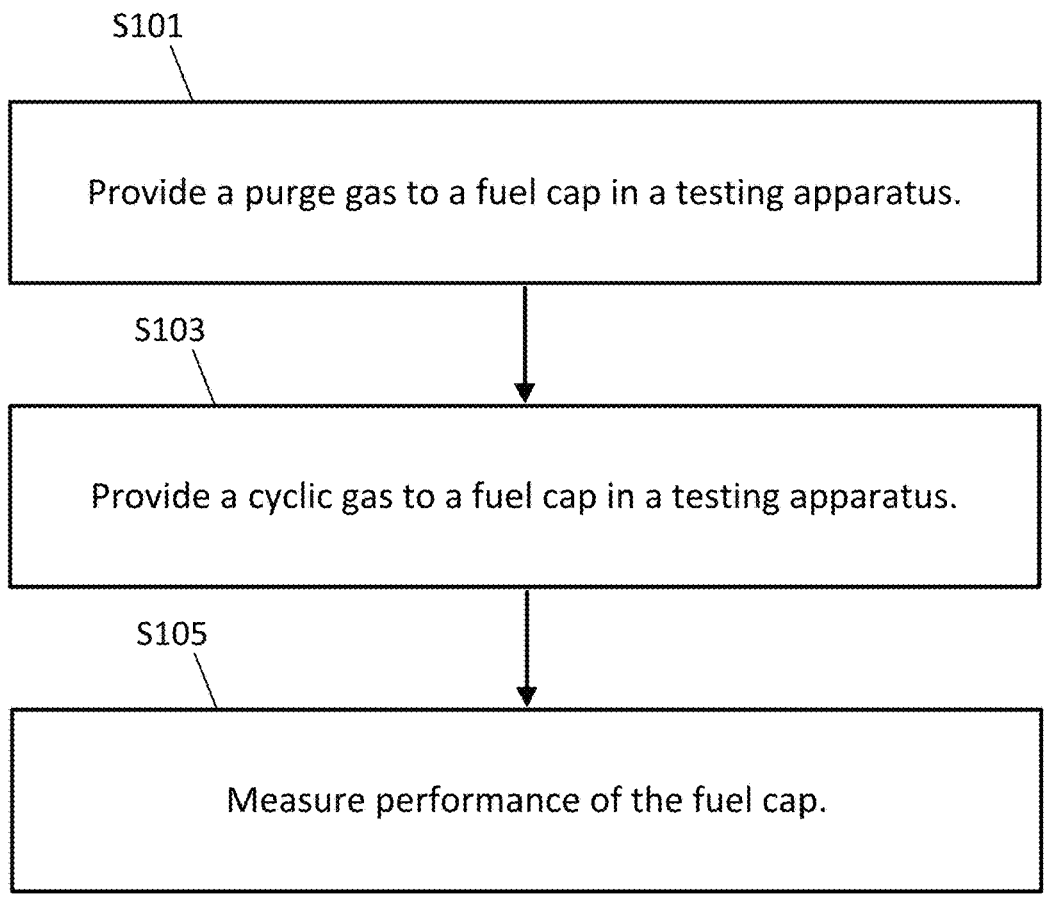
FIG. 7 illustrates an example flow chart for the operation of the controller of FIG. 6.

The pressure integrity check may also be performed with a vacuum. The controller 10 may turn on vacuum source 148 and valve 111*e* to pull a vacuum on the testing apparatus. The controller 10 monitors the pressure of the system over time using the pressure sensor(s) 212*b* to measure the stability of the negative (below atmospheric pressure) pressure over time to ensure there is no leak as represented by a pressure rise. The pressure integrity check may be performed in between testing sequences in order to maintain system accuracy. FIG. 7 illustrates an example flowchart for operation of test apparatus to test the fuel cap 100. The testing procedure may be optionally performed by the controller 10. Additional, different, or fewer acts may be included.

At S101, the method includes providing, in a first direction, a purge gas from a first input to a bidirectional flow path through a gas manifold supporting the fuel cap 100. The bidirectional flow path is formed, at least in part, by the removable cover 101 including the first input for the purge gas. The purge gas may be nitrogen and/or air.

As shown in FIG. 2, the purge gas may be provided from a high purge flow (e.g., $N_2$), through the input of the removable cover 131 and through the fuel cap 100 and the output of the base 135 to the pressure gauge. The vacuum purge may provide a vacuum to draw the purge gas. The purging process may be performed for a predetermined amount of time (e.g., purging time).

The purging process may be repeated multiple times by drawing a predetermined number of volumes of nitrogen or dry air through the testing apparatus. The amount of purging gas may be set according to the volume of the hydrocarbon filter 300 and may vary according to fuel cap type or model.

At act S103, the method includes providing, in a second direction, a cyclic gas from a second input to the bidirectional flow path through the gas manifold 133 supporting the fuel cap 100. The bidirectional flow path is formed, at least in part, by a base 135 configured to support the gas manifold 133. The cyclic load gas may be a mixture of nitrogen and butane. The mass flow sensor 212d may provide feedback for monitoring mass flow rates of both the purge gas ($N_2$ or air) and saturation gas nitrogen or butane ($N_2/C_4H_{10}$). The sensor data from the mass flow sensors 212d may allow the controller to perform automatic control of the purge gas and/or saturation gas. The cyclic gas may be performed by a predetermined amount of time (e.g., cyclic time period) before the process proceeds to act S105.

At act S105, the method includes measuring a performance (e.g., removal of emissions, absorptivity of the hydrocarbon filter 300) of the fuel cap 100. For example, the method may include determining a first mass of the fuel cap 100 before the cyclic gas and determining a second mass of the fuel cap 100 after the cyclic gas. The difference between the first mass and the second mass may be compared to a threshold value. The fuel cap 100 may be determined to pass the emissions test when the difference is greater than the threshold and fail the emissions test when the difference is less than the threshold. For example, pass/fail criteria may be based on an environmental standard or standardized test procedure which states one or more time periods for operating the testing apparatus in the saturation step and/or the purge step, which together may be referred to as the testing cycle. The testing procedure may specify a quantity for the testing cycle (e.g., at least 10 times). The testing procedure may specify a selection of one of the last two, recorded "butane working capacity" (BWC) measurements (e.g., the lowest one) is used as the final BWC. This final BWC is then compared to one or more predetermined values. For example, the processor 200 may access a lookup table stored in memory 201 that associated predetermined values for the butane working capacity indexed by fuel tank size and/or engine model and/or fuel cap model.

The cyclic gas may be provided from low flow (e.g., $N_2$) or low flow (e.g., $C_4H_{10}$) through the input of the base 135, through the fuel cap 100, and the output of the removable cover 131. Optionally, after the output of the sealed container, the cyclic gas that has been scrubbed by the fuel cap 100 may be provided to a carbon bypass bed. Eventually, after the carbon bypass bed, the resultant gas may be vented to the ambient environment or atmosphere.

The fuel cap 100 and/or hydrocarbon filter 300 may be tested by measuring and recording the weight changes of the fuel cap 100 and/or hydrocarbon filter 300 on scale 1 and the hydrocarbon bypass container on scale 2 concurrently during the saturation step or only the fuel cap 100 and/or hydrocarbon filter 300 on scale 1 during the purge step. The total weight gain recorded in the hydrocarbon bypass container on scale 2 can also be monitored, recorded and compared using an algorithm to identify potential problems associated with oversaturation of the carbon bed. For example, FIG. 2 illustrates scale 1 for measuring the weight of the fuel cap 100 before and after testing (e.g., before and after acts S101 or before and after acts S103). The change in weight (or mass) may correspond to the molecules (e.g., grams of $C_4H_{10}$) adsorbed by the hydrocarbon filter 300.

The cyclic load gas may be provided, downstream of the fuel cap 100 and the base 135, to the carbon bypass bed. The carbon bypass bed may adsorb any emission not adsorbed by the hydrocarbon filter 300. The fuel cap 100 and/or hydrocarbon filter 300 may be further tested according to the weight of the carbon bypass bed. For example, FIG. 2 illustrates scale 2 for measuring the weight of the carbon bypass bed before and after testing (e.g., before and after acts S101 or before and after acts S103). The change in weight (or mass) may correspond to the particles adsorbed by the carbon bypass bed.

Figure 8:
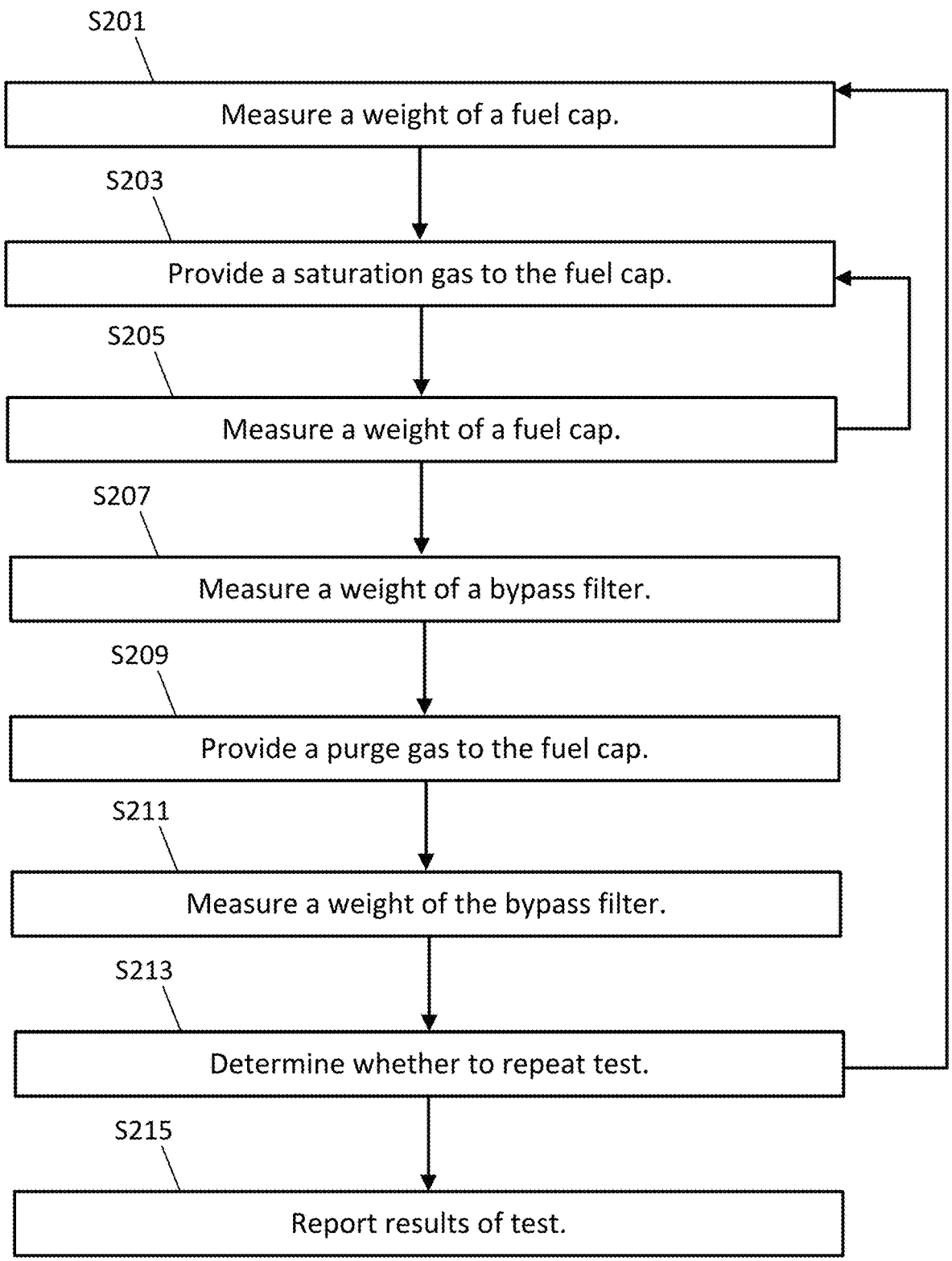
FIG. 8 illustrates an example flow chart for the operation of the testing apparatus.

FIG. 8 illustrates an example flow chart for the operation of the testing apparatus through multiple sequences as commanded by the controller 10. Additional, different, or fewer acts may be included.

In acts S201-S205, the controller 10 monitors a weight of a fuel cap coupled to the testing assembly in a first sequence. At act S201, the controller 10 measures a weight of the fuel cap. The controller 10 receives sensor data from a weight sensor 212c for an initial weight (mass) of the fuel cap. In other examples, act S201 is omitted and the initial weight is entered by a user or pre-stored for the particular fuel cap. At act S203, the controller 10 provides a saturation gas to the fuel cap. The controller 10 may send a valve actuation command in order to open a saturation gas valve (e.g., valve 111a). The valve position is adjusted in response to the valve actuation command.

At act S205, the controller 10 measures a weight of the fuel cap again. The controller 10 may again receive sensor data from weight sensor 212c for a subsequent weight (mass) of the fuel cap. The controller 10 determines whether or not to repeat monitoring of the fuel cap. In some examples, the determination of whether to repeat is based on a counter. That is, after each weight measurement, the controller 10 increments a counter. When the counter has reached a predetermined number, the controller 10 stops repeating the first sequence. In another example, the determination of whether to repeat is based on a weight comparison. The controller 10, in response to each subsequent weight measurement, compares the weight of the fuel cap to a threshold. In some examples, the difference in weight for the last two measurements is compared to the threshold. When the weight, or change in weight, does not exceed the threshold, the controller 10 repeats the first sequence, and in the subsequent iteration adjusts at least one valve position in response to the comparison of the weight, or change in weight with the threshold. When the weight, or change in weight, exceeds the threshold, the controller 10 proceeds to the second sequence. Transitioning to the second sequence involves the controller 10 generate valve actuation commands to close a valve for the saturation gas and open a valve for the purge gas to purge the fuel cap.

Acts S207-S211, the controller 10 performs the second sequence. At act S207, the controller 10 measures a weight of the bypass filter. The controller 10 receives sensor data from a weight sensor 212c for an initial weight (mass) of the bypass filter. In other examples, act S207 is omitted and the initial weight is entered by a user or pre-stored for the particular bypass filter. At act S209, the controller 10 provides a purge gas to the fuel cap. The controller 10 may send a valve actuation command in order to open a purge gas valve (e.g., valve 111c and/or 111e). The valve position is adjusted in response to the valve actuation command. Optionally, the flammability test may be performed by measuring the oxygen level in the testing apparatus.

At act S211, the controller 10 measures a weight of the bypass filter again. The controller 10 may again receive sensor data from weight sensor 212c for a subsequent weight (mass) of the bypass filter.

At act S213, the controller 10 determines whether or not to repeat the test again. When the test is repeated the controller 10 returns to act S201 to perform the first sequence and the second sequence one or more additional times. In some examples, the determination of whether to repeat the test is based on a counter. That is, after each weight measurement for the bypass filter in act S211, the controller 10 increments a bypass filter test counter. When the bypass filter test counter has reached a predetermined number (e.g., 10), the controller 10 stops repeating the test. In another example, the determination of whether to repeat is based on a weight comparison for the bypass filter. The controller 10, in response to each subsequent weight measurement for the bypass filter test, compares the weight of the bypass to a threshold for the bypass filter. In some examples, the difference in weight for the last two measurements of the bypass filter is compared to the threshold for the bypass filter. When the weight, or change in weight, does not exceed the threshold for the bypass filter, the controller 10 repeats the test. When the weight, or change in weight, exceeds the threshold, the controller 10 proceeds to act S215.

In act S215, the controller 10 reports the test results. The controller 10 may generate messages including the measurements made on the fuel cap and the bypass filter. The measurements may be provided to a user by local display or transmitted (e.g., via a network) to a computer or mobile device. The controller 10 may process the measurements before sending the measurements. For example, the controller 10 may select a predetermined number of the most recent measurements. In one example, the last three measurements for the weight of the fuel cap and the weight of the bypass filter are selected. In some examples, the controller 10 may average the results in order to simplify reporting.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a keypad, a touchscreen, or other structure configured to allow a user to enter data such as pressure or other sensor thresholds. The input device 204 may include a connection to a network, a smartphone, a tablet, a personal computer configured to electronically transmit the trigger command to the control system. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus for testing a fuel cap, the apparatus comprising:
    a gas manifold configured to provide a bidirectional flow path through the fuel cap;
    a fuel cap connector integrated with or coupled to the gas manifold, the fuel cap connector configured to connect the fuel cap to the gas manifold;
    a base configured to support the gas manifold and provide at least a first gas input to the gas manifold and through the fuel cap via the bidirectional flow path; and
    a removable cover configured to be removably connected to the gas manifold and provide at least a second gas input to the gas manifold and through the fuel cap via the bidirectional flow path.

2. The apparatus for testing the fuel cap of claim 1, further comprising:
    at least one seal between the gas manifold and the removable cover.

3. The apparatus for testing the fuel cap of claim 2, wherein the at least one seal include an O-ring.

4. The apparatus for testing the fuel cap of claim 1, wherein the first gas input includes a cyclic load gas.

5. The apparatus for testing the fuel cap of claim 4, wherein the cyclic loading includes a mixture of nitrogen and butane.

6. The apparatus for testing the fuel cap of claim 1, wherein the second gas input includes a purge gas.

7. The apparatus for testing the fuel cap of claim 6, wherein the purge gas includes nitrogen.

8. The apparatus for testing the fuel cap of claim 1, further comprising:
    a plurality of solenoid valves including at least one valve associated with the first gas input and at least one valve associated with the second gas input.

* * * * *